United States Patent [19]

Suyama et al.

[11] Patent Number: 4,794,481
[45] Date of Patent: Dec. 27, 1988

[54] APPARATUS FOR LOADING AND DRIVING AN INFORMATION RECORDING MEDIUM ENCASED IN A CARTRIDGE

[75] Inventors: Satoshi Suyama, Neyagawa; Toru Arakawa, Nishinomiya; Kiyoshi Masaki, Amagasaki; Souji Oba, Katano, all of Japan

[73] Assignee: Matsushita Electric Industrial Co. Ltd., Osaka, Japan

[21] Appl. No.: 829,999

[22] Filed: Feb. 18, 1986

[30] Foreign Application Priority Data

| Feb. 19, 1985 | [JP] | Japan | 60-30936 |
| Feb. 20, 1985 | [JP] | Japan | 60-32010 |
| Jul. 18, 1985 | [JP] | Japan | 60-158962 |
| Jul. 18, 1985 | [JP] | Japan | 60-159027 |

[51] Int. Cl.$^4$ .............................................. G11B 5/016
[52] U.S. Cl. ............................. 360/99.06; 360/99.12; 369/77.2
[58] Field of Search ................. 360/97, 99, 133, 96.5, 360/86, 93; 369/270, 271, 194, 77.1, 77.2

[56] References Cited

U.S. PATENT DOCUMENTS

| 3,678,481 | 7/1972 | Dalziel et al. | 360/99 |
| 4,380,781 | 4/1983 | Hirata | 360/97 |
| 4,445,155 | 4/1984 | Takahashi et al. | 360/99 |
| 4,525,758 | 6/1985 | Nakagawa et al. | 360/133 |
| 4,546,396 | 10/1985 | Schatteman | 360/96.5 |
| 4,604,666 | 8/1986 | Kitahara et al. | 360/97 X |
| 4,618,903 | 10/1986 | Oishi et al. | 360/132 |
| 4,646,176 | 2/1987 | Shimaoka et al. | 360/97 |

FOREIGN PATENT DOCUMENTS

| 0137965 | 4/1985 | European Pat. Off. | 360/133 |
| 0158315 | 10/1985 | European Pat. Off. | 360/97 |
| 56-54665 | 5/1981 | Japan . | |
| 0102361 | 6/1983 | Japan | 360/99 |

Primary Examiner—John H. Wolff
Assistant Examiner—Andrew L. Sniezek
Attorney, Agent, or Firm—Wenderoth, Lind & Ponack

[57] ABSTRACT

A drive apparatus for driving an information recording medium encased in a cartridge has a protection element for protecting the recording medium. The drive apparatus has an action member for cooperating with the protection element. The action member is projected out of the apparatus when the cartridge is inserted into the apparatus, and remains in the apparatus when the cartridge is detached from the apparatus. The apparatus comprises a drive unit and a cartridge mounting unit disposed on a base body of the drive unit. The cartridge mounting unit han an operation button disposed at a position which is furthest apart from the attached cartridge and opposite to the base body with respect to the attached cartridge. When the recording medium is a flexible disk, the disk is pressed onto a recording or reproducing head by a pad. An arm for supporting the pad allows the pressure exerted by the pad on the disk to increase with the rotation of the disk.

24 Claims, 7 Drawing Sheets

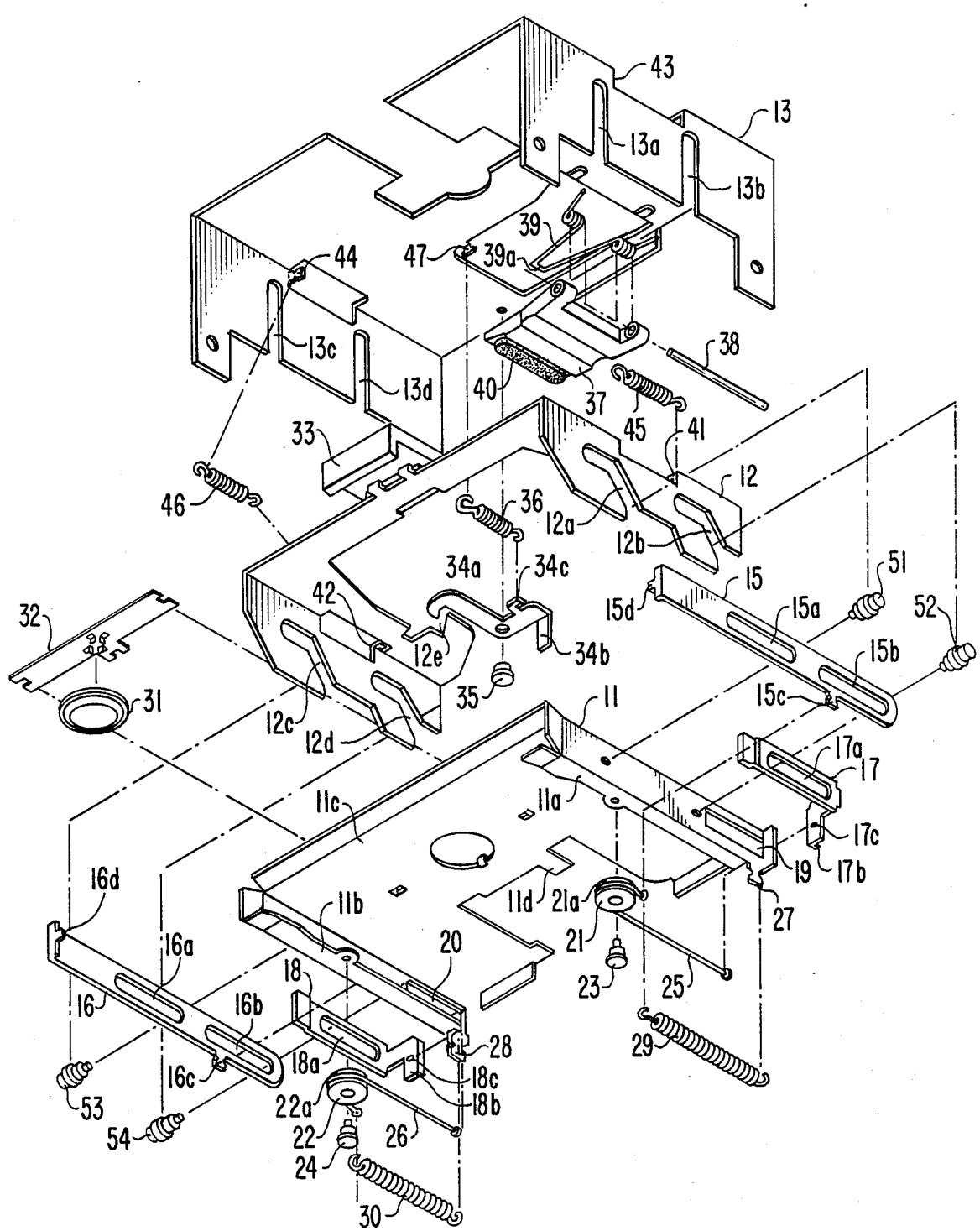

APPARATUS FOR LOADING AND DRIVING AN INFORMATION RECORDING MEDIUM ENCASED IN A CARTRIDGE

BACKGROUND OF THE INVENTION

1. Field of the Invention

This invention relates to an external information storage device for information processing equipment such as computers and word processors, and more particularly to a drive apparatus for driving an information recording medium encased in a cartridge having a hard case when recording data onto the recording medium or when reading data from the recording medium.

2. Description of the Prior Art

Recently, the demand for floppy disk devices as computer external storage devices have been repidly increasing because the floppy disk is cheap, easy to handle and is easily attachable to and detachable from a drive apparatus. The latest portable personal computers and word processors have built-in floppy disk storage devices. Since such portable equipment is required to be smaller in size and lighter in weight, a small and low profile storage device is strongly needed.

Floppy disk cartridges and drive apparatusses disclosed in U.S. Pat. Nos. 4,525,758 and 4,445,155 disclose typical portable information processing equipment. However, these conventional drive apparatuses are structurally difficult to reduce in size. The cartridge disclosed in U.S. Pat. No. 4,525,758 has head windows normally closed by shutters which are connected to an end of an elongated flexible band which has at the other end a protrusion exposed outside of the cartridge. The protrusion, when the cartridge is inserted into the drive apparatus, is pushed by a member fixed to the drive apparatus so that the flexible band moves to open the shutter. The cartridge must be almost fully inserted into the drive apparatus so that the protrusion can be pushed in a distance to fully open the shutter. In other words, the length of the drive apparatus (in the cartridge inserting direction) must be large enough so that the position of the fully pushed protrusion is in the drive apparatus. The cartridge disclosed in U.S. Pat. No. 4,445,155 has a notch for inhibiting data from being written onto the built-in magnetic disk. Since this notch is disposed near a rear corner of the cartridge, the cartridge must be almost fully inserted into the drive apparatus. As described above, the size of the conventional drive apparatus was limited by the standardized structure of the cartridge.

Another obstacle for reducing the size of the floppy disc drive apparatus is a pad for pushing the flexible magnetic disc against the magnetic head. Such a pad is disclosed in U.S. Pat. No. 3,678,481. The pad is fixed to an end of a rotatable arm which is rotatable about a pivot disposed at an end of a head carriage movable in the radial direction of the magnetic disk. The arm is urged in such a direction that the pad is pushed against the magnetic head so that the magnetic disk contacts the magnetic head in a proper contact condition. With this structure, however, the size of the head carriage in the longitudinal direction of the drive apparatus must be large, and thus, the drive apparatus must also be long.

An improved pad is disclosed in Japanese Laid-Open patent application No. 56-54665, in which an arm mounting the pad is rotatably mounted on the frame of the drive apparatus, and the pad is lengthened in the head moving direction. However, this structure still has the following problems. The parallel relation between the pad surface and the head surface is not maintained due to variations of the thickness of the pad, thickness of the adhesive to fix the pad, length of the arm and position of the pivot of the arm. Furthermore, the pad creeps due to high temperature or high humidity so that the pad surface becomes curved in the form of the head surface. Thus, the contact pressure exerted by the pad onto the head will not be uniform, so that reliable recording and reproduction of data will not be expected after a long period of use.

SUMMARY OF THE INVENTION

An object of the present invention is to provide an information recording medium drive apparatus which has a remarkably reduced size (length and height) compared with the conventional drive apparatus.

Another object of the present invention is to provide a drive apparatus in which it is easy to attach and detach a cartridge having an information recording medium encased therein.

Still another object of the present invention is to provide a drive apparatus to which a cartridge having an information recording medium encased therein can be accurately attached.

Yet another object of the present invention is to provide an information recording medium drive apparatus which has a highly reliable data recording and reproducing performance.

A further object of the present invention is to provide an information recording medium drive apparatus having a cartridge mounting unit separated from a drive unit so as to improve productivity of the drive apparatus.

A still further object of the invention is to provide an information recording medium drive apparatus which allows a label on a cartridge to be easily visible even when the cartridge is attached to the drive apparatus.

An information recording medium drive apparatus of the present invention has at least one of the following three means. The first means is for allowing means provided in a cartridge having an information recording medium encased therein to function when the cartridge is attached to or detached from the drive apparatus. The means provided in the cartridge may be a means for opening or closing a head window on the cartridge or a means for inhibiting undesirable data writing. The first means projects from the drive apparatus when the cartridge is inserted into the drive apparatus, and enters into the drive apparatus when the cartridge is detached from the cartridge. The second means is an operation member or an operation button which is disposed at a position furthest apart from the cartridge attached to the drive apparatus and opposite to a base body of a drive unit with respect to the attached cartridge so as to be easily operated by an operator to eject the cartridge. The third means comprises a pad for pressing the recording medium onto a recording or reproducing head, and an arm haing an end at which the pad is rotatably mounted about a pivot. The third means functions such that the pressure of the pad against the recording medium will increase as the recording medium rotates. When the first means is provided the cartridge can be attached to the drive apparatus in such a state that a rear part of the cartridge extends out of the drive apparatus.

The above and other objects, features and advantages of the present invention will be apparent from the following description taken in connection with the preferred embodiments and the accompanying drawings.

BRIEF DESCRIPTION OF THE DRAWINGS

FIG. 4 is an exploded perspective view of an embodiment of a cartridge mounting unit of a drive apparatus of the invention;

DESCRIPTION OF THE PREFERRED EMBODIMENTS

Hereinafter, the present invention will be described as a drive apparatus for a cartridge having a magnetic disk encased therein as an information recording medium.

Figure 1:
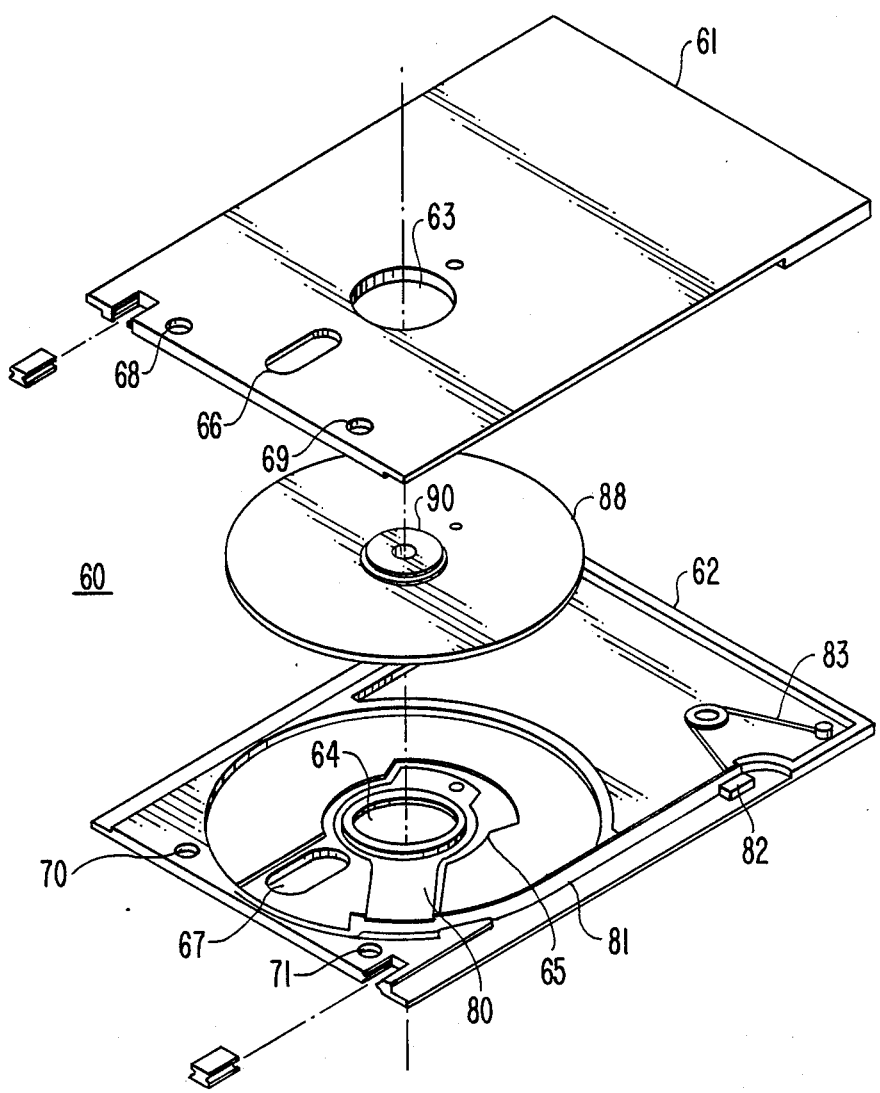
FIG. 1 is an exploded perspective view of a cartridge applicable to a drive apparatus of the invention.

Referring to FIG. 1 showing a typical magnetic disk cartridge, a cartridge 60 basically comprises an upper case 61, a lower case 62 and a magnetic disk 88 encased between the cases 61 and 62. The upper and lower cases 61 and 62 respectively have center openings 63 and 64 in which a disk hub 90 is inserted, head windows 66 and 67 into which a magnetic head will be inserted when the cartridge is attached to the drive apparatus, and positioning holes 68, 69 and 70, 71 to which a positioning pin will be fitted when the cartridge is attached to the drive apparatus. The head window 67 is normally closed by a shutter 80 which is rotatably mounted on a ring protrusion 65 provided along the circumference of the center opening 64. The head window 66 is also normally closed by a similar configuration (not shown). The shutter 80 is connected at an end thereof with one end of a flexible band 81 so as to be rotatable about the center opening 64 by movement of the flexible band 81 in the longitudinal direction thereof. The flexible band 81 is urged by a spring 83 in a direction to close the shutter 80. At the other end of the flexible band 81 is a protrusion 82 exposed at a side of the cartridge 60. When the cartridge is inserted into the drive apparatus, the protrusion 82 is pushed by an element of the drive apparatus so that the flexible band 81 moves in the direction to open the shutter 80 to allow the magnetic head to contact the magnetic disk 88 via the head window 67.

In short, a cartridge applicable to the drive apparatus of the invention may have such a configuration that a shutter normally closing a head window will be opened by a force supplied from the drive apparatus when the cartridge is attached to the drive apparatus.

Figure 2:
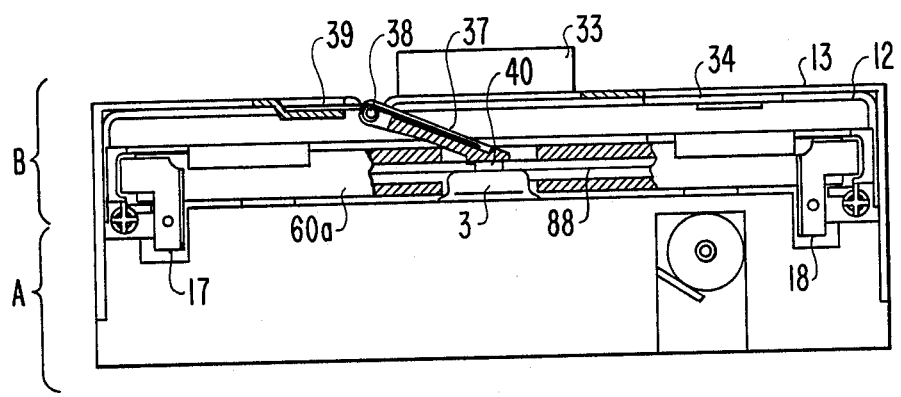
FIG. 2 is a rear view of an embodiment of the drive apparatus of the invention, partly broken away to show a pad for pressing a recording disk onto a head.

FIG. 2 shows a rear view of an embodiment of a drive apparatus of the invention. Referring to FIG. 2, the drive apparatus comprises a drive unit A and a cartridge mounting unit B which are separated from each other.

Figure 3:
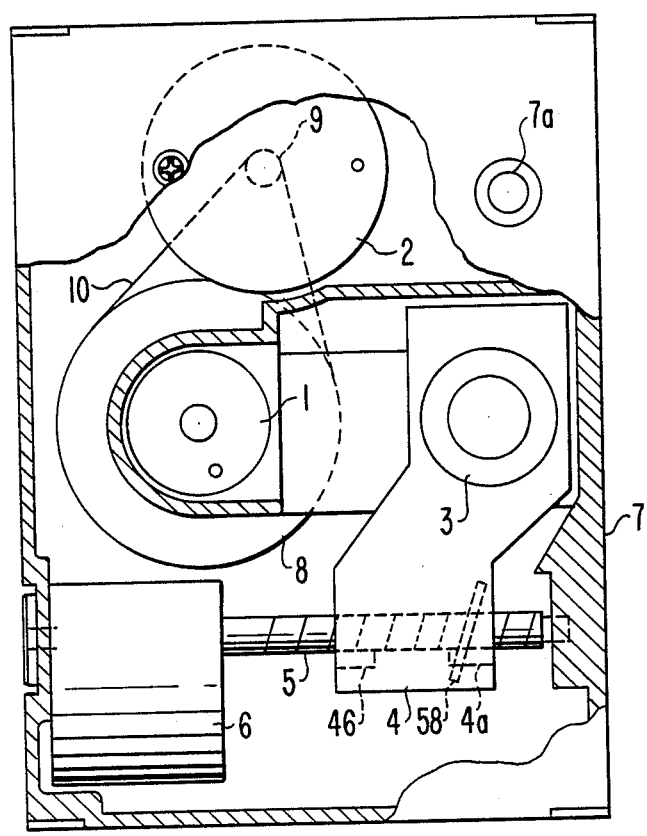
FIG. 3 is a partially broken away plan view of an embodiment of a drive unit of a drive apparatus of the invention.

An embodiment of the drive unit A is shown in FIG. 3. Referring to FIG. 3, the drive unit comprises a spindle 1 for rotating the magnetic disk 88, a drive motor 2 for driving a spindle 1, a head carriage 4 having a magnetic head 3 mounted thereon, a lead screw 5 for driving the head carriage 4, a stepping motor 6 for rotating the lead screw 5 as an output shaft, and a base body 7 for mounting the construction elements described above.

The spindle 1 engages at an end with the disk hub 90 to transmit a rotational driving force to the disk hub 90. To the other end of the spindle 1 is fixed a flywheel 8. The drive motor 2 is a DC motor whose radial dimension is larger than the axial dimension thereof. A small pulley 9 is fixed to the shaft of the drive motor 2. The pulley 9 is connected to the flywheel 8 via a thin elastic drive belt 10. The drive motor 2 is controlled to rotate at a desired number of rotations, and the rotational driving force is transmitted via the pulley 9, the drive belt 10 and the flywheel 8 to the spindle 1.

The head carriage 4 has such a shape that the dimension in the widthwise direction of the drive unit is larger than the dimension in the longitudinal direction of the drive unit. The magnetic head 3 is mounted on an upper surface of the head carriage 4 near an end in the longitudinal direction of the head carriage 4. At a lower surface near the other end in the longitudinal direction of the head carriage 4 are provided a needle 58 engaging with the lead screw 5, a pair of reference protrusions 4a and 4b which contact the lead screw 5, and a means (not shown) for continuously urging the reference protrusions 4a and 4b them continuously keep in contact with the lead screw 5.

The stepping motor 6 rotates intermittently so that the angle subtended by each rotational movement corresponds to the number of pulse signals applied thereto. The turning motion of the stepping motor 6 is converted to a linear motion of the head carriage 4 along the lead screw 5 by means of the lead screw 5 and the needle 58. Thus, the stepping motor 6 can reciprocate the head carriage 4 so as to move the magnetic head 3 to a position on a desired recording track of the magnetic disk 88.

An embodiment of the cartridge mounting unit B is shown in FIG. 4. Referring to FIG. 4, the cartridge mounting unit has a holder 11, slide plate 12 and an outer plate 13. Two pairs of pins 51–54 are fixed to opposite side surfaces of the holder 11. The pin 51 is inserted into a guide hole 15a of an action member 15 and the pin 52 is inserted into a guide hole 15b of the action member 15 and a guide hole 17a of a move member 17, whereby the action member 15 is slidably supported by the pins 51 and 52 and the move member 17 is slidably supported by the pin 52. The pin 53 is inserted into a guide hole 16a of an action member 16 and the pin 54 is inserted into a guide hole 16b of the action member 16 and a guide hole 18a of a move member 18, whereby the action member 16 is slidably supported by the pins 53 and 54 and the move member 18 is slidably supported by the pin 54.

The move members 17 and 18, respectively, have at their ends cartridge contact portions 17b and 18b which protrude into an internal space of the holder 11 through guide holes 19 and 20, respectively, provided at the side surfaces of the holder 11. The cartridge contact portions 17b and 18b will contact a front surface of a cartridge when the cartridge is inserted into the internal space of the holder 11.

Cartridge support portions 11a and 11b extending, respectively, from the lower sides of the side surfaces of the holder 11 and parallel to the upper surface of the holder 11 will support the inserted cartridge. Shafts 23 and 24 are fixed to the lower surfaces of the cartridge support portions 11a and 11b, respectively. Pulleys 21 and 22 having circumferential guide grooves 21a and 22a are rotatably mounted on the shafts 23 and 24, respectively. A string 25 guided along the guide groove 21a of the pulley 21 is fixed at one end through a hole 17c provided at the cartridge contact portion 17b of the move member 17, and hooked at the other end by a hook 15c provided on the lower edge of the action member 15. A string 26 guided along the guide groove 22a of the pulley 22 is fixed at one end through a hole 18c provided at the cartridge contact porton 18b of the move member 18, and hooked at the other end by a hook 16c provided on the lower edge of the action member 16. Each of the strings 25 and 26 should be mechanically strong and flexible, but not elastic (not expanded or contracted by an external force or a temperature or humidity change), and may be a synthetic resin string or a metal wire. Tension springs 29 and 30 are respectively mounted between the hook 15c of the action member 15 and a hook 27 provided at the rear end of the cartridge support portion 11a of the holder 11 and between the hook 16c of the action member 16 and a hook 28 provided at the rear end of the cartridge support portion 11b of the holder 11 so as to elastically urge the action members 15 and 16 toward the rear end of the holder 11. Thus, the tension springs 29 and 300 apply specific tension to the strings 25 and 26, respectively, so that the move members 17 and 18 are elastically urged in the opposite direction to the direction of the elastic urging force applied to the action members 15 and 16 are held at positions nearest to a cartridge inserting entrance 11c within movable ranges of the move members 17 and 18. The strings 25 and 26 connect the move members 17 and 18 with the action members 15 and 16, respectively, without slackening. It may be easily understood that the pulleys 21 and 22 reverse the directions of the forces generated by the tension springs 29 and 30 via the strings 25 and 26. Thus, the strings 25 and 26 and the pulleys 21 and 22 constitute a conversion means to transmit the movements of the move members 17 and 18 to the movements of the action members 15 and 16.

The holder 11 is further provided with a clamper 31 for elastically urging the disk hub 90 of the magnetic disk 88 toward the spindle 1 of the drive unit A and a plate spring 32 for biasing the clamper 31.

The slide plate 12 is a U-shaped member having at its side surfaces cam portions 12a–12d for slidably engaging with the pins 51–54, respectively. Near a center of the front edge of the slide plate 12 is fixed a operation button 33.

The outer plate 13 supports a lock lever 34 and a rotatable arm 37 on a lower surface of its upper plate portion. The lock lever 34 is rotatably mounted on a shaft 35 fixed to the lower surface of the upper plate portion of the outer plate 13. A pad 40 is mounted on a free end of a lower surface of the rotatable arm 37. The pad 40 extends in a direction in which the magnetic head 3 will move. This rotatable arm 37 is rotatable about a pivot shaft 38 and is urged downward by a pressure spring 39 which is also rotatably mounted on the pivot shaft 38. The pivot shaft 38 is fixed to the lower surface of the upper plate portion of the outer plate 13. The pressure spring 39 is mounted at both ends to the upper plate portion of the outer plate 13 and contacts, at its center bent portion 39a, a free end portion of an upper surface of the rotatable arm 37 so that the pad 40 is elastically urged toward the magnetic head 3. The position of the pivot shaft 38 is located above a position which is ahead of the position of the pad 40 in a rotating direction of the magnetic disk 88 so that the pressure of the pad 40 against the surface of the magnetic disk 88 will increase with the rotation of the magnetic disk 88. This feature will be described later in more detail. When the cartridge is not attached to the drive apparatus, the rotatable arm 37 contacts a protrusion 11d provided on the holder 11 to be prevented from rotating in the urged direction.

The pins 51–54 provided on the side surfaces of the holder 11 are respectively inserted into the cam portions 12a–12d of the slide plate 12 from the inside to the outside of the slide plate 12, and are further inserted into vertically elongated holes 13a–13d provided at the side plate portions of the outer plate 13. Accordingly, the holder 11 can reciprocate along the vertically elongated holes 13a–13d of the outer plate 13. In other words, the holder 11 is capable of vertically moving toward or away from the drive unit A.

The slide plate 12 is reciprocally movable in a direction nearly perpendicular to the moving direction of the holder 11 by the slidable engagement of the cam portions 12a–12d with the pins 51∝54. The slide plate 12 is urged in a direction opposite to a cartridge inserting direction (indicated by an arrow C in FIGS. 5A and 5B) by tension springs 45 and 46 which are respectively mounted between protrusions 41 and 42 provided on the slide plate 12 and protrusions 43 and 44 provided on the outer plate 13.

The lock lever 34 is urged in a direction in which a notch 34a provided at an end of the lock lever 34 is biased toward a notch 12e provided on the slide plate 12 by a tension spring 36 which is hooked at one end by a protrusion 34c provided near the other end of the lock lever 34 and hooked at the other end by a protrusion 47 provided on the upper plate portion of the outer plate 13. Accordingly, the lock lever 34 normally engages the notch 12e of the slide plate 12 when the cartridge is not inserted into the holder 11. When the cartridge is inserted into the holder 11, a bent portion 34b provided at the other end of the lock lever 34 to expose the inside of the holder 11 is pushed by the cartridge, so that the lock lever 34 is disengaged from the notch 12e.

Next, the operation of the drive apparatus having the cartridge mounting unit of FIG. 4 will be described.

Figure 5A:
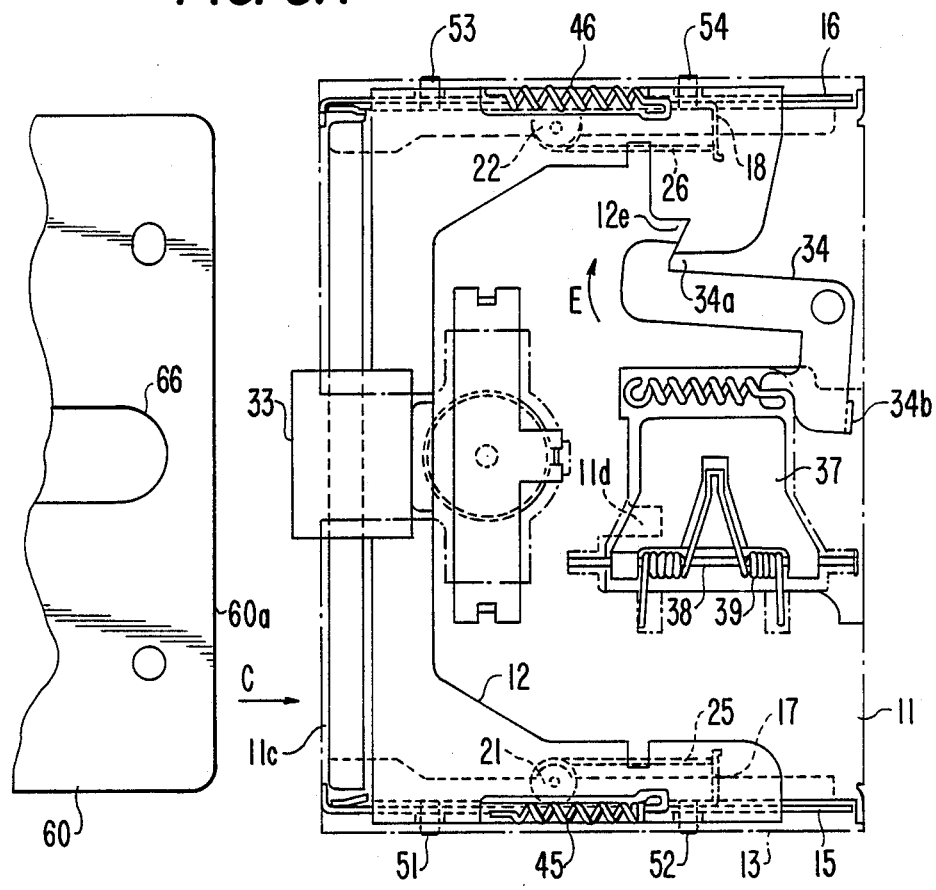
FIGS. 5A and 5B are plan and side views, respectively, of a drive apparatus using the cartridge mounting unit of FIG. 4, showing a state in which a cartridge is not inserted into the drive apparatus.
Figure 5B:
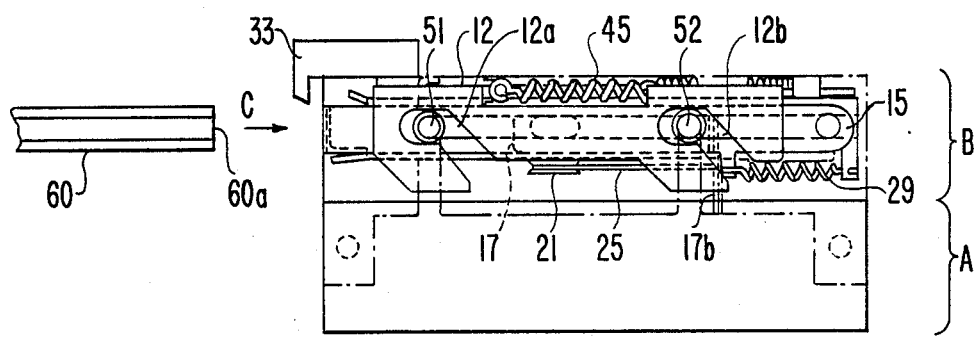

FIGS. 5A and 5B show a state in which the cartridge 60 is not inserted into the cartridge mounting unit B. The slide plate 12 is in a position in which the operation button 33 is fully pushed, i.e. in the position moved rightmost in FIGS. 5A and 5B. The lock lever 34, with the notch 34a engaging the notch 12e of the slide plate 12, is holding the slide plate 12 to the outer plate 13 against the urging forces of the tension springs 45 and 46.

The holder 11 with the pins 51–54 lifted by the cam portions 12a–12d is hold at a position furthest apart from the base body 7 of the drive unit A. The action members 15 and 16 are elastically urged in the direction opposite to the cartridge inserting entrance 11c by the tension springs 29 and 30 so that action members 15 and 16 including the protrusions 15d and 16d are entirely held within the cartridge mounting unit B. The elastic urging forces applied to the action members 15 and 16 are transmitted to the strings 25 and 26, reversed in direction by the pulleys 21 and 22, and applied to the move members 17 and 18, respectively. Accordingly, the move members 17 and 18 are elastically urged to positions nearest to the cartridge inserting entrance 11c within the movable ranges thereof. The rotatable arm 37 subjected to the urging force of the pressure spring 39 is supported by the protrusion 11d of the holder 11 so as to be approximately parallel with the upper plate portion of the outer plate 13.

When the cartridge is inserted from the inserting entrance 11c into the internal space of the holder 11 and moved in the direction indicated by the arrow C, the front surface 60a of the cartridge 60 first contacts the contact portions 17b and 18b of the move members 17 and 18. Thereafter, the move members 17 and 18 are moved in the direction C in accordance with the movement of the cartridge 60 in the direction C. With this movement, the action member 15 and 16 respectively connected to the move members 17 and 18 via the strings 25 and 26 and the pulleys 21 and 22 move in the direction opposite to the direction C. The distances of over which the action members 15 and 16 are moved are equal to those over which the move members 17 and 18 are moved, respectively. Since the action members 15 and 16 are always urged in the reverse direction (direction C) to their moving direction by the tension springs 29 and 30, the strings 25 and 26 will never slack. According to the inserting movement of the cartridge 60 in the direction C, the action members are projected out of the cartridge mounting unit B. The length of the projected portion of each of the action members 15 and 16 is equal to the inserted distance of the cartridge 60. One of the protrusions 15d and 16d respectively provided at the front ends of the action members 15 and 16 (the protrusion 15d in this case) contacts the protrusion 82 provided on the flexible band 81 of the cartridge 60 and pushes the same in the direction opposite to the direction C so that the flexible band 81 is moved to open the shutter 80.

When the cartridge 60 is further moved in the direction C, the front surface 60a of the cartridge 60 will touch the bent portion 34b of the lock lever 34. Since the lock lever 34 is being subjected to a moment in a direction indicated by an arrow E in FIG. 5A by the tension spring 36, a force is applied from the bent portion 34b to the front surface 60a of the cartridge 60 in the direction opposite to the cartridge inserting direction C and the force acts in the direction to push back the cartridge 60. When the cartridge 60 is further pushed to move against the pushing back force, the lock lever 34 is turned in a direction opposite to the direction E, so that the notch 34a of the lock lever 34 is disengaged from the notch 12e of the slide plate 12.

At this time, the action members complete their projecting movement and are held in specified positions. The shutter 80 of the cartridge 60 is fully opened so that the head windows 68 and 69 are fully opened to accept the magnetic head 3.

The slide plate 12 with the engagement at the notch 12e released moves in the directon opposite to the direction C under the urging force of the tension springs 45 and 46. With this movement of the slide plate 12, the cam portions 12a–12d of the slide plate 12 move the pins 51–54 downward along the vertically elongated holes 13a–13d of the outer plate 13, whereby the holder 11 together with the cartridge 60 held therein moves downward toward the drive unit A. With this movement of the holder 11, the rotatable arm 37 contacting the protrusion 11d of the holder 11 turns downward about the pivot shaft 38 under the urging force of the pressure spring 39 so that the pad 40 moves toward the head 3 of the drive unit A.

Figure 6A:
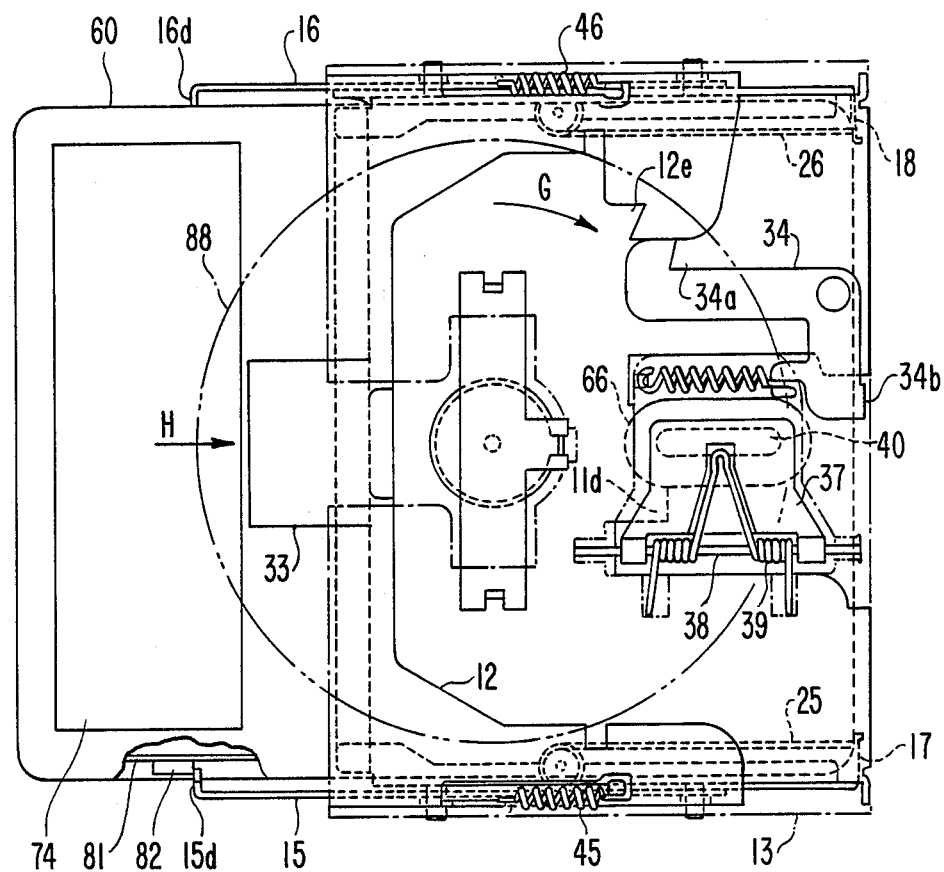
FIGS. 6A and 6B are plan and side views, respectively, of the drive apparatus using the cartridge mounting unit of FIG. 4, showing a state in which a cartridge is attached to the drive apparatus.
Figure 6B:
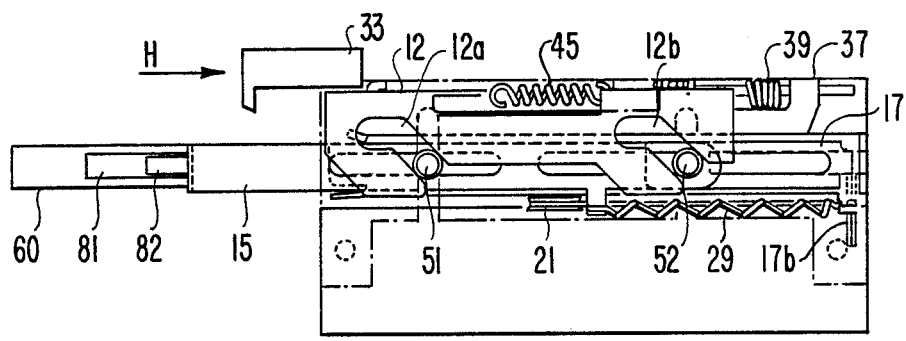

FIGS. 6A and 6B show a state in which the holder 11 has completed the downward movement and is held in a specified position, i.e. the state in which the cartridge 60 is completely attached to the drive apparatus. The slide plate 12 is in a position at which the operation button 33 is projects furthest from the drive apparatus (moved to the leftmost position in FIGS. 6A and 6B). The holder 11 and the cartridge 60 are closest to the base body 7 of the drive unit A, and are furthest away from the operation button 33.

The cartridge 60 is always being urged in the direction opposite to the inserting direction (direction C in FIGS. 5A and 5B) by the move members 17 and 18. However, since the positioning pin 7a (in FIG. 3) provided on the base body 7 of the drive unit A is fitted to the positioning holes 68, 70 or 69, 71 of the cartridge 60, the cartridge 60 is not moved by the urging force of the move members 17 and 18.

The magnetic disk 88 in the cartridge 60 is pressed against the magnetic head 3 by the pad 40 to be ready for data recording or reproduction. The pad 40 is mounted on the rotatable arm 37 which is supported by the pivot shaft 38 mounted on the outer plate 13. Since the pivot shaft 38 is located above a position on the magnetic disk 88 ahead of a location on the magnetic disk 88 contacted by the pad 40 in a rotating direction G of the magnetic disk 88 (i.e. a point on the disk 88 passes the position below the pad 40 first, and thereafter passes the position below the pivot shaft 38) as shown in FIG. 6A, the pressing force of the pad 40 against the magnetic disk 88 is larger when the magnetic disk 88 is rotating than when the magnetic disk 88 is stationary. The reason for this can be explained as follows.

When the magnetic disk 88 is rotating, friction is created between the contacting surfaces of the pad 40 and the magnetic disk 88. Due to this friction, the pad 40 is subjected to a force in the rotating direcon of the magnetic disk 88, so that the turnable arm 37 is subjected to a moment around the pivot shaft 38 in the urged direction of the rotatable arm 37. Since the angle formed by the rotatable arm 37 and the surface of the magnetic disk 88 is an acute angle (less than 90°) as shown in FIG. 2 and the magnetic disk 88 is rotating in the direction G as shown in FIG. 6A, the moment produced by the friction acts on the turnable arm 37 so as to press the pad 40 against the magnetic disk 88. This additional pressing force will not increase infinitely, but approaches a certain value which is substantially determined by an initial pressing force (at the stationary state of the magnetic disk 88), the distance between the pivot shaft 38 and the contact surface of the pad 40, the distance between the pivot shaft 38 and the surface of the magnetic disk 88, and the frictional coefficient between the contacting surfaces of the pad 40 and the magnetic disk 88. Therefore, the pressing force of the pad 40 against the magnetic disk 88 during the rotation of the magnetic disk 88 can be freely designed to be an arbitrary desired value. Experiments by the applicants showed that the additional pressing force due to the friction will be several % to several tens % of the initial pressing force.

The increased pressing force of the pad 40 solves the conventional problems to assure reliable data recording and reproduction. That is, even if the contacting condition of the pad 40 with the disk 88 is not uniform at the stationary state of the disk 88 due to variations of the thickness of the pad 40, the dimensions of the arm 37, and the positions of the pivot shaft 38, the pad 40 is pressed against the disk 88 securely and uniformly when the disk 88 is rotating. Furthermore, even if the contact surface of the pad 40 is deformed due to high temperature or high humidity, the pad 40 is pressed against the disk 88 securely and uniformly when the disk 88 is rotating.

Next, the operation to detach the cartridge 60 from the drive apparatus will be described. When detaching the cartridge, an operator may push the operation button 33 in a direction indicated by an arrow H shown in FIGS. 6A and 6B. Since the operation button 33 is in the position furthest away from the mounted cartridge 60, the operator can push the operation button 33 very easily. When the operation button 33 is pushed in the direction H, the slide plate 12 is moved in the same direction H. With this movement of the slide plate 12, the cam portions 12a–12d respectively guide the pins 51–54 of the holder 11 to move upward along the vertically elongated holes 13a–13d of the outer plate 13. Therefore, the holder 11 and the cartridge 60 held therein move upward and away from the base body 7 of the drive unit A.

With this upward movement of the holder 11, the rotatable arm 37 contacting the protrusion 11d of the holder 11 turns about the pivot shaft 38 in the direction opposite to the urging force of the pressure spring 39, so that the pad 40 is moved away from the surface of the magnetic disk 88.

When the slide plate 12 reaches the position as shown in FIGS. 5A and 5B, the lock lever 34 rotates in the direction E, so that the notch 34a of the lock lever 34 engages with the notch 12e of the slide plate 12. At this time, the holder 11 is held in the position furthest apart from the base body 7 of the drive unit A, and the rotatable arm 37 is held approximately parallel with the upper plate portion of the outer plate 13. The cartridge 60 released from the positioning pin 7a of the drive unit A is ready to be removed.

The cartridge 60 is urged in the direction opposite to the direction C (in FIGS. 5A and 5B) by the move members 17 and 18. The urging forces of the move members 17 and 18 are produced by the tension springs 45 and 46, and transmitted via the action members 15 and 16 and the strings 25 and 26. Therefore, the cartridge 60 moves in the direction opposite to the direction C keeping in contact with the move members 17 and 18. At the same time, the action members 15 and 16 move in the direction C in cooperation with the movement of the move members 17 and 18 so as to enter into the cartridge mounting unit B. The distances over which the action members 15 and 16 are moved are equal to those over which the move members 17 and 18 move, or the moving distance of the cartridge 60.

The flexible band 81 of the cartridge 60 is urged in the direction to close the shutter 80 by the spring 83. The urged direction of the flexible band 81 corresponds to the moving direction of the action members 15 and 16. Accordingly, the flexible band 81 in contact at the protrusion 82 thereof with the protrusion 15d of the action member 15 moves to follow the movements of the action members 15 and 16 so as to allow the shutter 80 close the head windows 66 and 67.

The action members 15 and 16 and the move members 17 and 18, after completing the above-described movements, assume the states as shown in FIS. 5A and 5B. The action members 15 and 16 including the protrusions 15d and 16d are entirely stored in the cartridge mounting unit B. The move members 17 and 18 are positioned closest to the cartridge inserting entrance 11c within their movable ranges. The head windows 66 and 67 of the cartridge 60 are completely closed by the shutter members. However, the cartridge 60 is not completely moved out of the drive apparatus, but remains in a position in which a part of the cartridge is left in the cartridge mounting unit B so that the cartridge does not drop out of the drive apparatus. The cartridge 60 will be pulled out of the drive apparatus by the operator.

In the above-described embodiment, the member to be operated on by the action member was the means for opening or closing the head windows of the cartridge, the means comprising the shutter, the flexible band and the protrusion on the flexible band. But, the action member may be modified to actuate other types of members of other cartridges for protecting recording media encased therein. For example, the action member may be modified to detect a means for inhibiting undesired data writing or erroneous data erasing, for example, a notch provided on the cartridge. Furthermore, in the above-described embodiment, the conversion means for changing the direction of movement of the move member to a different direction of movement of the action member was comprised by the string or wire and the pulley. But, the conversion means may be modified to have any other configurations (some of which will be described later). For example, the pulley can be replaced by a pin, or the string and the pulley can be substituted by a chain or toothed band and a gear, respectively.

An important point in the foregoing description is that a part (say a third of a full length) of the cartridge is exposed out of the drive apparatus when the cartridge is attached to the drive apparatus. Since the protrusion 82 of the flexible band 81 is actuated by the projected action member 15 or 16, it is not necessary to store the entire cartridge 60 in the drive apparatus. Therefore, the length of the drive apparatus can be remarkably smaller than that of the conventional drive apparatus. Furthermore, since a display label 74 provided on the case of the cartridge 60 can be seen when the cartridge 60 is attached to the drive apparatus, the operator can easily recognize what kind of information is recorded on the recording medium encased in the attached cartridge.

Figure 7:
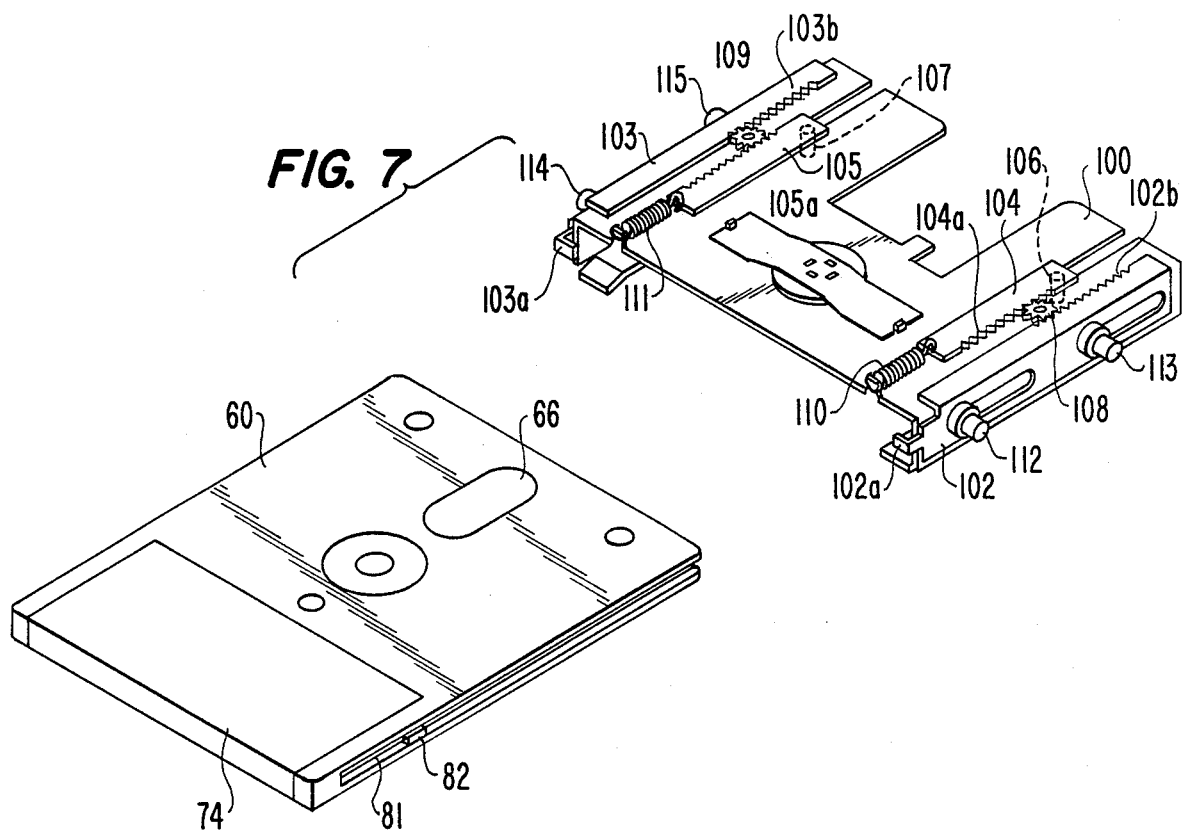
FIG. 7 is a perspective view of another example of a holder applicable to a drive apparatus of the invention.

FIG. 7 shows a modified conversion means of the drive apparatus of the invention, in which the same part as that shown in FIG. 4 is omitted for simplicity. Action members 102 and 103 are slidably mounted on both sides of a holder 100, respectively. The action members 102 and 103, respectively, have at the respective front ends protrusions 102a and 103a, and at the respective sides on the upper plate of the holder 100 rack portions 102b and 103b. The protrusions 102a and 103a for engaging the protrusion 82 of the cartridge 60 for moving the flexible band 81. On the upper plate of the holder 100 are slidably mounted move members 104 and 105 extending parallel to the action members 102 and 103, respectively. The move members 104 and 105, respectively, have at the respective rear ends pins 106 and 107 projecting into the internal space of the holder 100, and at the respective sides facing the action members 102 and 103 rack portions 104a and 105a. The rack portions 102b and 104a are engaged with a pinion 108 at the opposite sides of the pinion 108, respectively. The rack portions 103b and 105a are engaged with a pinion 109 at the opposite sides of the pinion 109, respectively. The pinions 108 and 109 are rotatably mounted on the upper plate of the holder 11. Thus, the action member 102 and the move member 104 are movable in opposite directions, and the action member 103 and the move member 105 are movable in opposite directions. The pins 106 and 107 are for engaging the front surface of the cartridge 60. The move members 104 and 105 are urged in the direction opposite to the cartridge inserting direction by tension springs 110 and 111, respectively, so that the action members 102 and 103 are urged in the cartridge inserting direction. Two pairs of pins 112-115 fixed to the side plates of the holder 100 slidably support the action members 102 and 103, and are inserted into cam portions of a slide plate similar to the slide plate 12 in FIG. 4 and also into vertically elongated holes of an outer plate similar to the outer plate 13 in FIG. 4.

Figure 8A:
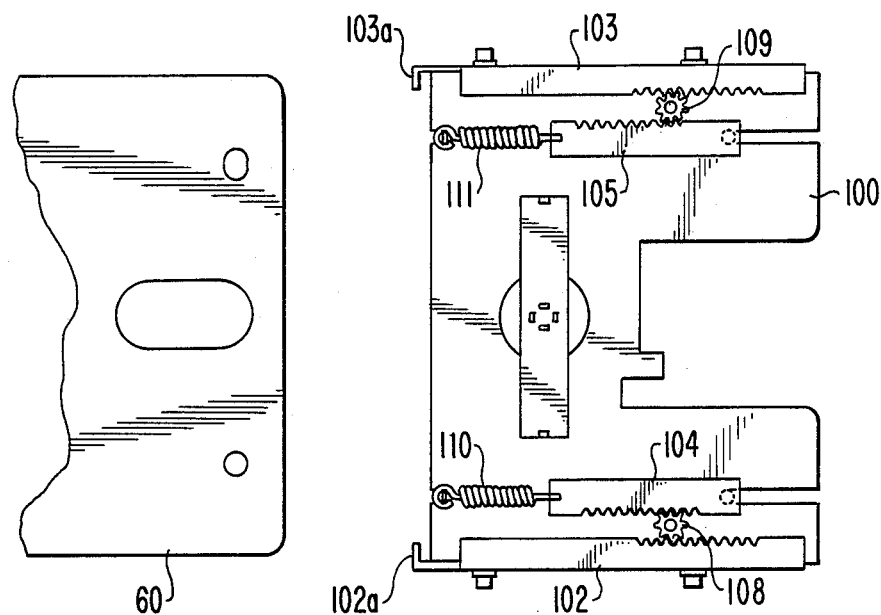
FIGS. 8A and 8B are plan views of the holder of FIG. 7, respectively, showing states in which a cartridge is not inserted and a cartridge is attached.

Next, operation of the FIG. 7 embodiment will be described with reference to FIGS. 8A and 8B. Referring to FIG. 8A, the cartridge 60 is not inserted into the drive apparatus. With cooperating actions of the tension springs 110 and 111 and the pinions 108 and 109, the move members 104 and 105 are urged in the leftward direction in the figure and the action members 102 and 103 are urged in the rightward direction in the figure. Therefore, the action members 102 and 103 are held within the drive apparatus.

When the cartridge 60 is inserted into the holder 100 and moved in the rightward direction, the cartridge 60 first touches the pins 106 and 107 of the move members 104 and 105. Thereafter, the move members 104 and 105 are moved rightward following the movement of the cartridge 60 to rotate the pinions 108 and 109, respectively. Accordingly, the action members 102 and 103 are moved leftward and project out of the drive apparatus. One of the protrusions 102a and 103a (102a in FIG. 8A) of the action members 102 and 103 is in contact with the protrusion 82 of the flexible band 81 and pushes the same to move the flexible band 81 to open the head windows 66 and 67 of the cartridge 60. When the cartridge 60 is further inserted rightward, the slide plate 12 is unlocked and moves in the leftward direction, and the holder 100 together with the cartridge 60 will move downward to be in the specified final position in the same way as described before in the case of the FIG. 4 embodiment.

Figure 8B:
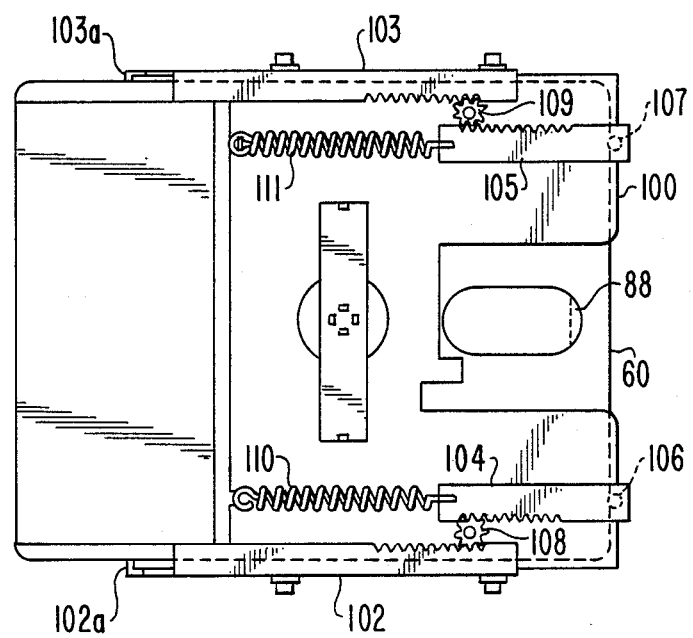

FIG. 8B shows the state in which the holder 100 is in the specified final position, i.e. the state in which th cartridge 60 is completely attached to the drive apparatus. The cartridge 60 with the head windows 66 and 67 fully opened is exposed at a part out of the drive apparatus, so that the label portion 74 can be easily seen.

The remaining operation of the apparatus not described above is the same as that described before with reference to FIGS. 5A, 5B, 6A and 6B. The operation to detached the cartridge is merely the reverse of the above-described attaching operation, and therefore may be easily understood.

Figure 9:
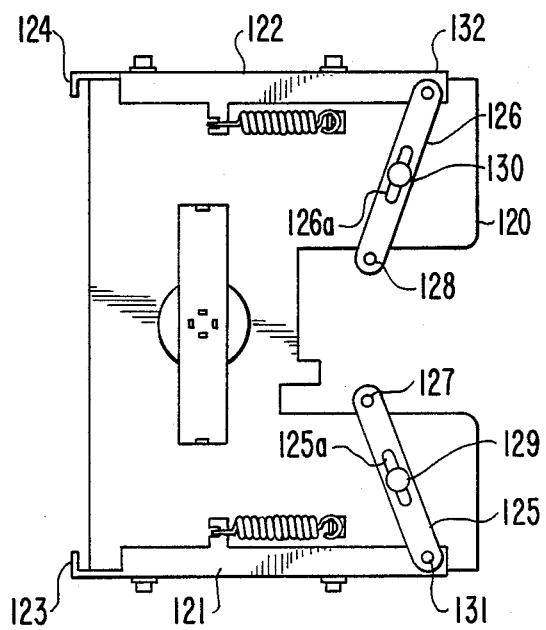
FIG. 9 is a plan view of still another example of a holder applicable to a drive apparatus of the invention.

FIG. 9 shows another modified conversion means of the drive apparatus of the invention, in which the same part as that shown in FIG. 4 is omitted for simplicity. Action members 121 and 122 are slidably mounted on both sides of a holder 120, and provided at the respective front ends with protrusion 123 and 124 for engaging the protrusion 82 of the cartridge 60. Pins 131 and 132 are respectively fixed to the action members 121 and 122 near the respective rear ends thereof. Move members 125 and 126 are provided at their respective centers with elongated holes 125a and 126a and are rotatably mounted at their respective one ends by the pins 131 and 132. The move members 125 and 126 are also provided at their respective other ends with pins 127 and 128 projecting into the internal space of the holder 120 for engaging the front surface of the inserted cartridge 60. To the elongated openings 125a and 126a are fitted fixed pins 129 and 130, respectively, fixed to the upper plate of the holder 120 so that the move members 125 and 126 are slidably along the fixed pins 129 and 130, respectively.

When the cartridge 60 is inserted into the holder 120 in the rightward direction in FIG. 9, the pins 127 and 128 engaged by the front surface of the cartridge 60 is pushed rightward, so that the move members 125 and 126 turn about the fixed pins 129 and 130 as supporting points, respectively, to move the pins 131 and 132 as points of action in the leftward direction. Accordingly, the action members 121 and 122 move in the direction (leftward) opposite to the cartridge inserting direction to project out of the drive apparatus. With this movement of the action members 121 and 122, one of the protrusions 123 and 124 pushes the protrusion 82 of the flexible band 81 of the cartridge 60 to move the shutters to open the head windows 66 and 67. When the cartridge 60 is furthermost inserted into the holder 120, the head windows 66 and 67 are completely opened, and the cartridge 60 itself is held with a part including the label portion being exposed out of the drive apparatus. The following operation is basically the same as that described before, and the cartridge detaching operation is the reverse of the cartridge attaching operation, which may be easily understood without any further explanation.

Although some preferred embodiments of the invention have been described above, the present invention should not be limited to the above embodiments. It should be understood that various changes and modifications may be made within the scope of the invention. For example, the information recording medium is not limited to the magnetic disk, but may be any other medium such as, for example, an optical disk, an optomagnetic disk or a semiconductor storage device. The drive unit may be modified according to the kind of recording medium used. The protecting means of the cartridge may be a means to actuate a shutter for the head windows, a notch for inhibiting erroneous data recording or any other means. The action members may be modified according to the kind of protection means of the cartridge.

What is claimed is:

1. An apparatus for driving an information recording medium encased in a cartridge, the cartridge having a head window through which information recorded on the recording medium is read and a protecting means movably mounted to the cartridge for moving between a closed position at which the protecting means covers the head window and an open position at which the head window is open, said apparatus comprising:
- a drive unit having a reading head for reading the information recorded on the recording medium through the head window when the protecting means is in the open position and a driving means for driving the recording medium;
- an outer casing connected to said drive unit and into which the cartridge is inserted in a cartridge insertion direction; and
- a cartridge mounting unit disposed within said outer casing and mounted to said drive unit for receiving the cartridge inserted in said outer casing and for opening the head window of the cartridge by moving the protecting means from the closed position to the open position, said cartridge mounting unit comprising
- move means for moving in response to the movement of the cartridge into said outer casing in said cartridge insertion direction,
- conversion means operatively connected to said move means for converting a force produced by the movement of said move means to a second force acting in a predetermined direction, and
- action means operatively connected to said conversion means for being moved by said second force in a direction opposite the insertion direction between a first position and a second position for engaging the protecting means of the cartridge and for moving the protecting means for the closed position to the open position to open the head window, said second position being a position at which said action means projects from said outer casing.

2. An apparatus for driving an information recording medium encased in a cartridge, the cartridge having a head window through which information recorded on the recording medium is read and a protecting means movably mounted to the cartridge for moving between a closed position at which the protecting means covers the head window and an open position at which the head window is open, said apparatus comprising:
- a drive unit having a reading head for reading the information recorded on the recording medium through the head window when the protecting means is in the open position and a driving means for driving the recording medium;
- an outer casing connected to said drive unit and into which the cartridge is inserted in a cartridge insertion direction; and
- a cartridge mounting unit disposed within said outer casing and mounting to said drive unit for opening the head window of the cartridge by moving the protecting means from the closed position to the open position, said cartridge mounting unit comprising
- a holder for receiving the cartridge inserted into the outer casing and for holding the cartridge in a fully inserted position of the cartridge, at which fully inserted position part of the cartridge projects from said outer casing,
- a move member movably mounted to said holder, said move member moving in response to the movement of the cartridge into said outer casing in said cartridge insertion direction,
- conversion means operatively connected to said move member for converting a force produced by the movement of said move member to a second force acting in a predetermined direction; and
- an action member movably mounted to said holder and operatively connected to said conversion means for being moved by said second force in a direction opposite the insertion direction between a first position and a second position for engaging the protecting means of the cartridge and for moving the protecting means of the cartridge from the closed position to the open position to open the head window, said second position being a position at which said action member projects from said outer casing.

3. An apparatus for driving an information recording medium as set forth in claim 2,
wherein said move member movably mounted to said holder is slidingly mounted to the holder for moving linearly in response to the movement of the cartridge in said cartridge insertion direction, said action member movably mounted to said holder is slidably mounted to the holder for moving linearly, and said conversion means comprises means for moving said action member linearly in a direction opposite to that in which said move member is moved in response to the movement of the cartridge.

4. An apparatus for driving an information recording medium as set forth in claim 2,
wherein said move member movably mounted to said holder is pivotally mounted to the holder for pivoting in response to the movement of the cartridge in said cartridge insertion direction, said action member movably mounted to said holder is slidably mounted to the holder for moving linearly, and said conversion means comprises means for converting the pivotal movement of said move member to a force acting in a linear direction to move said action member linearly.

5. An apparatus for driving an information recording medium as set forth in claim 2,
wherein said conversion means comprises a string which is fixed at one end to said move member and at the other end to said action member, and a pulley for guiding said string.

6. An apparatus for driving an information recording medium as set forth in claim 2,
wherein said conversion means comprises a first rack provided on said move member, a second rack provided on said action member, and a pinion engaging both of said first and second second racks.

7. An apparatus for driving an information recording medium as set forth in claim 2,
and further comprising means for maintaining the cartridge in said fully inserted position, and an operation element operatively connected to said maintaining means and operable by an operator for releasing the maintaining means to allow the cartridge to be withdrawn from said cartridge mounting unit,
said operation element being disposed on an opposite side of the cartridge from said drive unit when the cartridge has been inserted into said outer casing.

8. An apparatus for driving an information recording medium encased in a cartridge, the cartridge having a head window through which information recorded on the recording medium is read, a shutter for normally covering the head window, and an actuating member operatively connected to the shutter and actuatable by an external force for actuating the shutter to open the head window, said apparatus comprising:

a drive unit having a reading head for reading the information recorded on th recording medium through the head window when the head window is open and a driving means for driving the recording medium;

an outer casing connected to said drive unit and into which the cartridge is inserted in a cartridge insertion direction; and a cartridge mounting unit disposed within said outer casing and mounted to said drive unit for producing said external force to actuate the actuating member and open the head window of the cartridge, said cartridge mounting unit comprising a holder for receiving the cartridge inserted into the outer casing and for holding the cartridge in a fully inserted portion of the cartridge, at which fully inserted position part of the cartridge projects from said outer casing, a move member movably mounted to said holder, said move member being engaged by said cartridge when the cartridge is inserted into said holder in the cartridge insertion direction and for being moved by the cartridge engaged therewith, conversion means operatively connected to said move member for converting a force produced by the movement of said move member to a second force acting in a predetermined direction; and an action member movably mounted to said holder and operatively connected to said conversion means for being moved by said second force in a direction opposite the insertion direction to a position at which said action member projects out of said outer casing for abutting the actuating member of the cartridge to produce said external force to actuate the actuating member and open the head window.

9. An apparatus for driving an information recording medium as set forth in claim 8, wherein said move member movably mounted to said holder is slidingly mounted to the holder for moving linearly in response to the movement of the cartridge in said cartridge insertion direction, said action member movably mounted to said holder is slidably mounted to the holder for moving linearly, and said conversion means comprises means for moving said action member linearly in a direction opposite to that in which said move member is moved in response to the movement of the cartridge.

10. An apparatus for driving an information recording medium as set forth in claim 8, wherein said move member movably mounted to said holder is pivotally mounted to the holder for pivoting in response to the movement of the cartridge in said cartridge insertion direction, said action member movably mounted to said holder is slidably mounted to the holder for moving linearly, and said conversion means comprises means for converting the pivotal movement of said move member to a force acting in a linear direction to move said action member linearly.

11. An apparatus for driving an information recording medium as set forth in claim 8, wherein said conversion means comprises a string which is fixed at one end to said move member and at the other end to said action member, and a pulley for guiding said string.

12. An apparatus for driving an information recording medium as set forth in claim 8, wherein said conversion means comprises a first rack provided on said move member, a second rack provided on said action member, and a pinion engaging both of said first and said second racks.

13. An apparatus for driving an information recording medium as set forth in claim 8, and further comprising means for maintaining the cartridge in said fully inserted position, and an operation element operatively connected to said maintaining means and operable by an operator for releasing the maintaining means to allow the cartridge to be withdrawn from said cartridge mounting unit, said operation element being disposed on an opposite side of the cartridge from said drive unit when the cartridge has been inserted into said outer casing.

14. An apparatus for driving an information recording medium encasing in a cartridge, the cartridge having a head window through which information recorded on the recording medium is read and a protecting means movably mounted to the cartridge for moving between a closed position at which the protecting means covers the head window and an open position at which the head window is open, said apparatus comprising:

a drive unit having a reading head for reading the information recorded on the recording medium through the head window when the protecting means is in the open position and a driving means for driving the recording medium;

an outer plate forming an outer casing connected to said drive unit and into which the cartridge is inserted in a cartridge insertion direction; and a cartridge mounting unit disposed within said outer casing and mounted to said drive unit for receiving the cartridge inserted into said outer casing and for opening the head window of the cartridge by moving the protecting means form the closed position to the open position, said cartridge mounting unit comprising a holder for receiving the cartridge inserted into said outer casing and for holding the cartridge in a fully inserted position of the cartridge, at which fully inserted position part of the cartridge projects from said outer casing, said holder slidably mounted to said outer plate for reciprocating in holder moving directions extending perpendicular to said cartridge insertion direction between a first holder position spaced from said drive unit and a second holder position adjacent said drive unit when the cartridge is in said fully inserted position for allowing the recording medium encased in the cartridge held in said holder to be driven by said driving means;

a move member movably mounted to said holder, said move member moving in response to the movement of the cartridge into said outer casing in said cartridge insertion direction, conversion means operatively connected to said move member for converting a force produced by the movement of said move member to a second force acting in a predetermined direction; and an action member movably mounted to said holder and operatively connected to said conversion means for being moved by said second force in a direction opposite the insertion direction between a first position and a second position for engaging the protecting means of the cartridge and for moving the protecting means from the closed position to the open position to open the head window, the second position of said action member being a position at which said action member projects from said outer casing.

15. An apparatus for driving an information recording medium as set forth in claim 14, wherein said move member movably mounted to said holder is slidingly mounted to the holder for moving linearly in response to the movement of the cartridge in said cartridge insertion direction, said action member movably mounted to said holder is slidably mounted to the holder for moving linearly, and said conversion means comprising means for moving said action member linearly in a direction opposite to that in which said move member is moved in response to the movement of the cartridge.

16. An apparatus for driving an information recording medium as set forth in claim 14, wherein said move member movably mounted to said holder is pivotally mounted to the holder for pivoting in response to the movement of the cartridge in said cartridge inserting direction, said action member movably mounted to said holder is slidably mounted to the holder for moving linearly, and said conversion means comprises means for converting the pivotal movement of said move member to a force acting in a linear direction to move said action member linearly.

17. An apparatus for driving an information recording medium as set forth in claim 14, wherein said conversion means comprises a string which is fixed at one end to said move member and at the other end to said action member, and a pulley for guiding said string.

18. An apparatus for driving an information recording medium as set forth in claim 14, wherein said conversion means comprises a first rack provided on said move member, a second rack provided on said action member, and a pinion engaging both of said first and said second racks.

19. An apparatus for driving an information recording medium as set forth in claim 14, and further comprising a slide plate disposed between said outer plate and said holder, said slide plate slidably mounted to said outer plate for reciprocating in opposite slide plate moving direction extending perpendicular to said holder moving directions, said holder operatively connected to said slide plate for moving from said first holder position to said second holder position when said slide plate is moved in one of said slide plate directions and for moving from said second holder position to said first holder position when said slide plate is moved in the other of said slide plate directions, and an operation element connected to said slide plate and operable by an operator for moving said slide plate in said other of said slide plate directions to move said holder from said second position to said first position, the cartridge being disposed between said operation element and said drive unit when the cartridge has been inserted into said outer casing.

20. An apparatus for driving an information recording medium encased in a cartridge, the cartridge having a head window through which information recorded on the recording medium is read, a shutter member for normally covering the head window, and a shutter actuating member operatively connected to the shutter and movable by an external force acting in a predetermined direction for actuating the shutter to open the head window, said apparatus comprising:

a drive unit having a reading head for reading the information recorded on the recording medium through the head window when the head window is open and a driving means for driving the recording medium;

an outer casing connected to said drive unit and into which the cartridge is inserted in a cartridge insertion direction extending parallel to said predetermined direction; and a cartridge mounting unit disposed within said outer casing and mounted to said drive unit for producing said external force to actuate the actuating member and open the head window of the cartridge, said cartridge mounting unit comprising a holder for receiving the cartridge inserted into said outer casing, a move member movably mounted to said holder, said move member being engaged by said cartridge when the cartridge is inserted into said holder in the cartridge insertion direction and for being moved by the cartridge engaged therewith, a conversion means operatively connected to said move member for converting a force produced by the movement of said move member to a second force acting in a direction opposite the cartridge inserting direction; and an action member slidably mounted to said holder for moving in directions extending parallel to said predetermined direction, said action member operatively connected to said conversion means and being moved by said second force in the direction opposite to said cartridge insertion direction for engaging said shutter actuating member, for generating said external force, and for moving said shutter actuating member thereby opening the head window of the cartridge as the cartridge is inserted into said outer casing in the cartridge insertion direction.

21. An apparatus for driving an information recording medium as set forth in claim 20, wherein said holder for receiving the cartridge is also for holding the cartridge in a state in which part of the cartridge projects out of said outer casing when said cartridge has been inserted into said outer casing, and wherein said action member for being moved by said second force is movably by said second force in said direction opposite said cartridge insertion direction to a position at which said action member projects out of said outer casing to engage the shutter actuating member.

22. An apparatus for driving an information recording medium as set forth in claim 20, wherein said conversion means comprises a string which is fixed at one end to said move member and at the outer end to said action member, and a pulley for guiding said string.

23. An apparatus for driving an information recording medium as set forth in claim 20, wherein said conversion means comprises a first rack provided on said move member, a second rack provided on said action member, and a pinion engaging both of said first and said second second racks.

24. An apparatus for driving an information recording medium as set forth in claim 20,
and further comprising means for maintaining the cartridge in a fully inserted position after the cartridge is inserted into said outer casing in said cartridge insertion direction, and an operation element operatively connected to said maintaining means and operable by an operator for releasing the maintaining means to allow the cartridge to be withdrawn from said cartridge mounting unit,
the cartridge being disposed between said operation element and said drive unit when the cartridge has been inserted into said outer casing.

* * * * *